ered together by a spring to prevent catastrophic, accidental disen-
United States Patent Turner

[15] 3,641,838

[45] Feb. 15, 1972

[54] SEATS FOR VEHICLES

[72] Inventor: Harold Roy Turner, Walsall, England

[73] Assignee: H. R. Turner (Willenhall) Limited, Walsall, England

[22] Filed: Apr. 13, 1970

[21] Appl. No.: 27,770

[30] Foreign Application Priority Data

Oct. 24, 1969 Great Britain.......................52,107/69

[52] U.S. Cl............................................74/530, 297/369
[51] Int. Cl. .......................................................G05g 5/06
[58] Field of Search ..............74/533, 530, 107; 16/146, 145; 297/364, 365, 369, 373

[56] References Cited

UNITED STATES PATENTS 3,299,466   1/1967   Werner................................74/530 X
3,432,881   3/1969   Putsch et al. ............................16/146

Primary Examiner—William F. O'Dea
Assistant Examiner—F. D. Shoemaker
Attorney—Kurt Kelman

[57] ABSTRACT

An automobile seat which may be adjusted to any angle, or if desired, folded flat to permit ingress or egress of a passenger in a rear seat. The seat includes a pair of arcuate toothed gear segments which may be selectively disengaged to permit adjustment of the seat back angle but which are normally biassed together by a spring to prevent catastrophic, accidental disengagement thereof.

5 Claims, 5 Drawing Figures

INVENTOR
HAROLD R. TURNER
AGENT

PATENTED FEB 15 1972

INVENTOR
HAROLD R. TURNER
BY
AGENT

SEATS FOR VEHICLES

This invention relates to vehicle seats of the kind in which the seat back or squab is adjustable in angle relative to the seat base or cushion, by a mechanism including sets of teeth provided on the back and the base, and means for disengaging the teeth and subsequently reengaging them.

The objects of the invention are to provide improved seats and mechanisms therefore, which are simple to manufacture and facilitate trimming of the seat, whilst providing a robust construction adapted to withstand currently required loads in safety and performance tests.

In accordance with the invention, a mechanism comprises a pair of parts pivoted together, one of the parts having an elongated slot about the pivot axis permitting relative movement transversely of the pivot axis, the two parts being provided with sets of teeth which may be engaged and disengaged by said relative movement, and a cam also pivoted on said axis and effective when turned to react with an abutment and cause said relative movement, said cam being held in the teeth-engaged position by a spring and reacting with a second abutment in said position, said cam being restrained in movement by a carrier pivoted on one of the parts on the opposite side of the major axis of the slot to said second abutment.

Preferably the part forming part of, attached to, or attachable to, the backrest is located outside the other part when the mechanism is assembled to the seat, and the teeth are on the outer face of said other part, whereas the cam, carrier and spring lie inside, that is on the other face of that part.

One embodiment of the invention is now more particularly described with reference to the accompanying drawings, wherein:

FIG. 3 is a side view of the seat back adjusting mechanism in the locked position;

Figure 1:
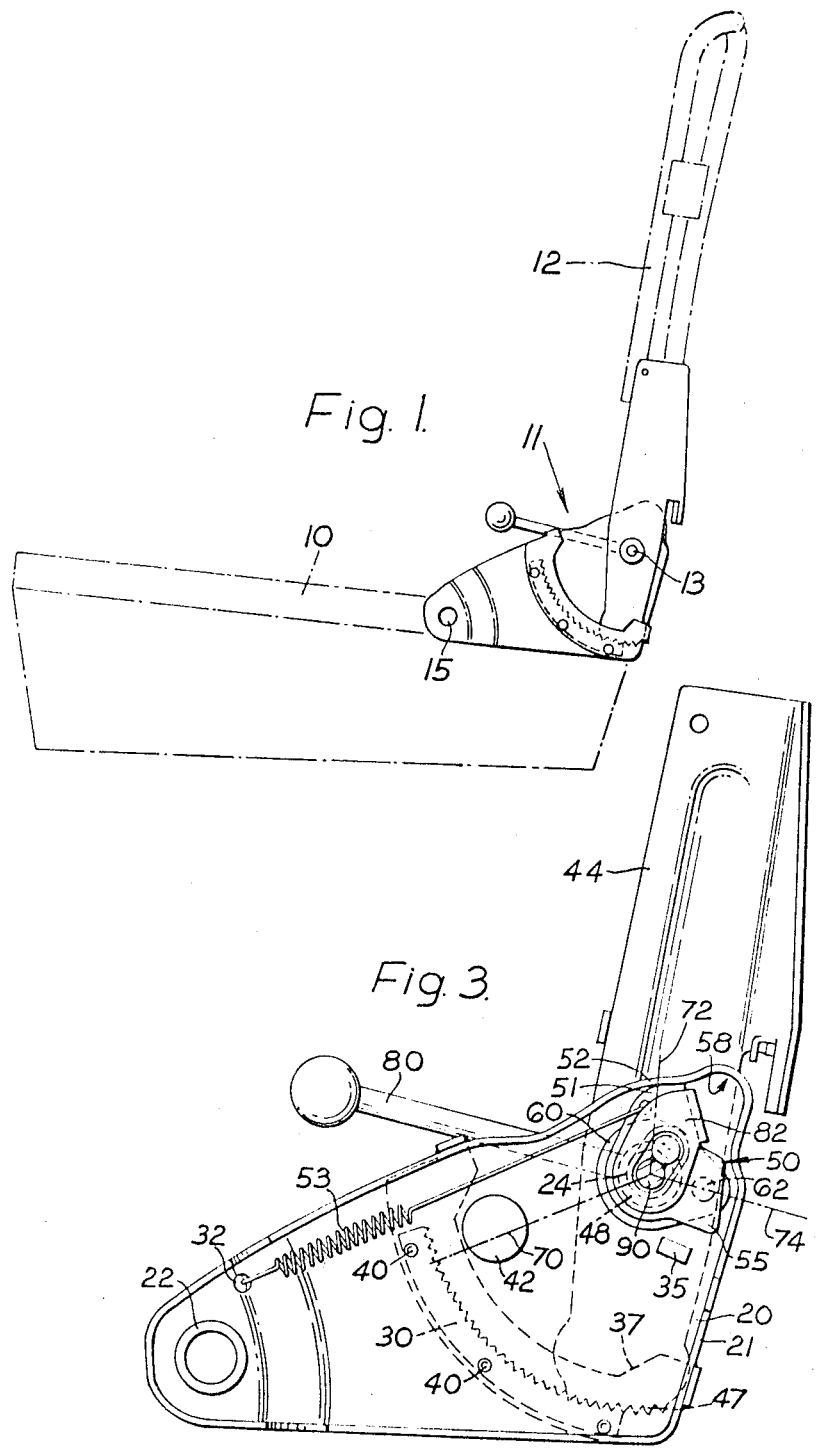
FIG. 1 is an elevation of a seat.

Referring now to the drawings, the seat (FIG. 1) comprises a seat base frame 10 to which is secured the mechanism 11, and a seat back frame 12 is pivoted on axis 13.

In certain cases the mechanism will be rigid with the seat frames, so that in any one adjusted position the backrest is fixed relative to the base, but we have chosen to illustrate a seat of the "throw-forward" type, as used, e.g., on certain two-door four-seat vehicles, in which the mechanism is also hinged to the seat base frame on axis 15. In this event catch means (not shown) may be provided to hold the mechanism and hence backrest against hinging about axis 15 at times when the seat back is not to be thrown forward for rear seat access. However if a fixed construction is required, the mechanism will be bolted, rivetted, welded or otherwise made fast with the seat base frame instead of being pivotably connected therewith.

Figure 2:
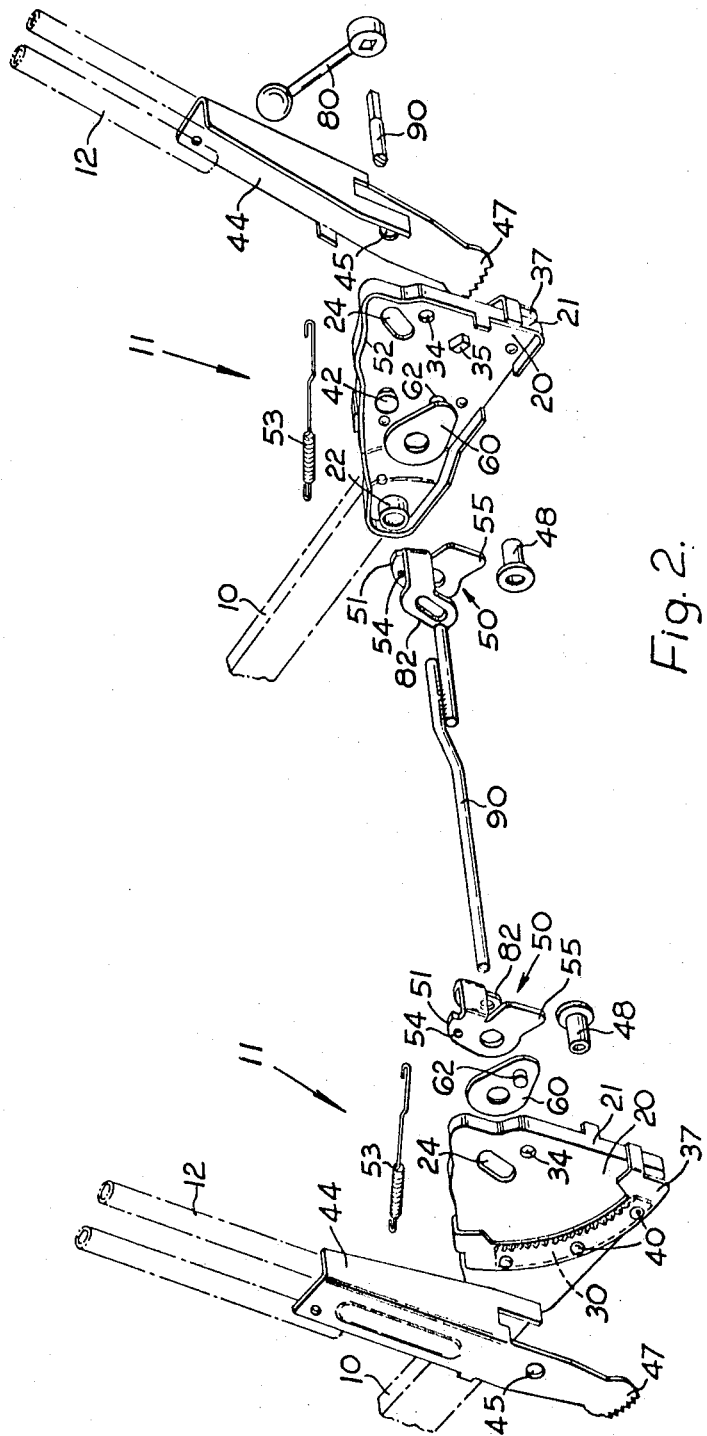
FIG. 2 is an exploded perspective view of the seat inclination controlling mechanism.
Figure 4:
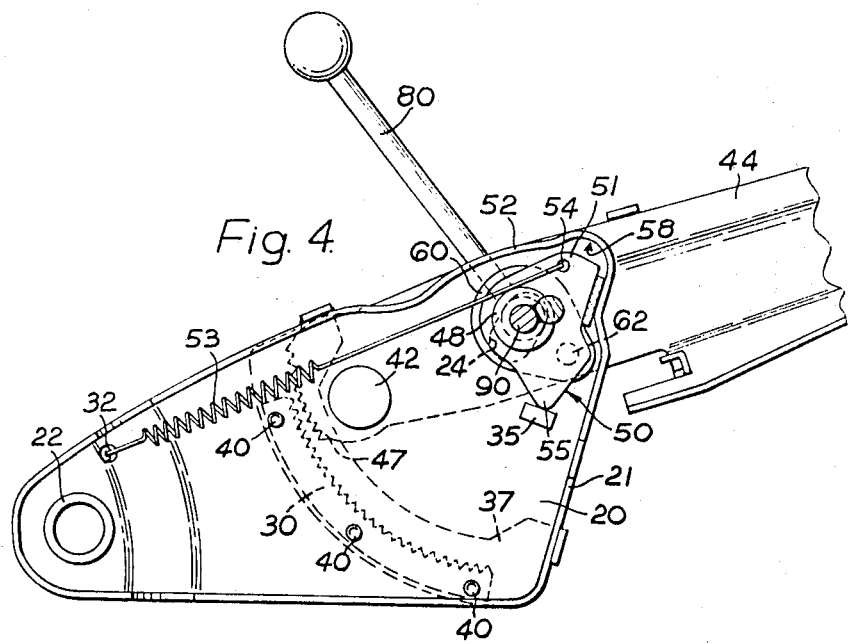
FIG. 4 is a side view of the seat back adjusting mechanism in the unlocked position so that the seat back may be set to any desired angle.
Figure 5:
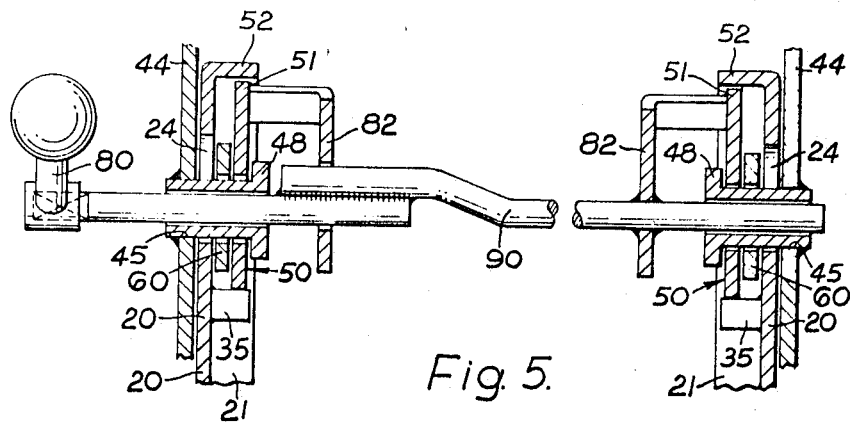
FIG. 5 is a fragmentary front elevation of the seat controlling mechanism.

Referring now to FIG. 2, it will be seen that in the illustrated construction, one mechanism is provided at each side of the vehicle seat, and these mechanisms are substantially identical except that certain components are provided in mirror image, that is in left-hand and right-hand sets according to which mechanism is concerned.

Each mechanism comprises a first plate 20 made as a pressing with a substantially continuous peripheral skirt 21, and a bush 22 providing the throw-forward pivot on axis 15; each plate has an elongated slot 24 extending downwardly and forwardly so that the axis of the slot approximately bisects the length of the arcuate toothed rack 30 (see FIG. 3). The plate also has a pair of holes 32, 34 and a lug 35, the purpose of which will be explained hereinafter.

Fixed to the outside face of each plate is the arcuate rack 30 referred to, which is concentric to the pivotal axis of the backrest, and said axis intersects the slot 24 axis. The rack is a separate pressing and is trapped between the plate and a shield 37, both rack and shield being held to the plate by spaced rivets 40 for example. A headed stud 42 is provided for engagement with hook means for holding the mechanism and backrest when throw-forward is not required.

The backrest is provided with a second plate 44 having an eye 45 and terminating in a set of teeth 47. A bush 48 is passed through the slot 24 and eye 45 and is welded to the plate 44 and serves to pivot the plate 44 and hence backrest to the plate 20 and hence seat base. As the bush is also slidable along the slot 24, this permits the seat back to be moved transversely of the pivot axis also.

Located inside the plate 20 is cam 50 which is journaled on the bush and has one lobe 51 arranged to abut the skirt 21 and 52 in one extreme angular position of the bush, and tension spring 53 is anchored to hole 32 in the plate and hole 54 in the cam to pull the cam to that position. Lobe 55 is provided to react with lug 35 when the cam is turned to stretch the spring, and this action takes lobe 51 out of abutment with the skirt and allows the leverage exerted to displace the cam along slot 24 taking lobe 51 into a recess 58 in the plate. The cam displacement moves the bush and hence the plate 44 likewise, and takes teeth 47 out of mesh with rack 30. Consequently in the said one extreme position the two sets of teeth on the one mechanism are meshed and the angle of the seat back is fixed, and in the other (spring-stretched) position, the teeth are disengaged and the seat back angle may be altered.

Due to the geometry of the design illustrated, forces tending to pivot the seat back are resisted—in part—by the spring tending to hold the bush in the end of slot 24 most adjacent the rack 30. The line of application of such forces may be acutely, normally or obtusely related to the major (length) axis of the slot according to the position of the backrest, and in some positions a vector component of the applied force may act to overcome the spring and release the mechanism inadvertently. This possibility is aggravated by the tolerances necessary in manufacture, particularly of the bush relative to the slot. To prevent this release, a carrier 60 is employed, and comprises a plate pivoted on a pin 62 in hole 34 and journaled on the bush. In cam movement along the slot, the carrier pivots and controls the position of the bush, i.e., restrains movement except in a controlled direction. Referring to FIG. 3, it will be seen that in one extreme position of the backrest relative to the seat base, the backrest extends along a line so that the teeth 47 are disposed symmetrically of chain-dot line 70, and any forces tending to disengage the teeth, whilst the cam is held by the spring in the illustrated angular position of the cam, are resisted by two component forces namely the abutment of cam lobe 51 with the skirt at 52 along line 72, and by the carrier via its pivot along line 74. For disengagement to occur, the carrier must turn, but is prevented by the cam abutment, and it will be seen that lines 72, 74 are approximately symmetrically disposed to line 70.

In the opposite extreme position of the backrest, the reaction is nearly in line with the line 72, so that the carrier appears to be ineffective and unnecessary; however, it is found that under certain load conditions even when in the said opposite extreme position, in the absence of the carrier, there is a tendency for the teeth to disengage, and this is wholly avoided when the carrier is present.

It will be seen that the carrier pivot on the plate must lie on the opposite side of the major axis of the slot to the abutment and reaction surface which holds the teeth engaged, in order to provide component reaction forces having a resultant which is in line with and opposite to teeth disengagement movement.

The cam is arranged to be turned, for disengagement purposes, by a handle 80, having a shank passed through the bush and engaged with a lug 82 of the cam.

The two mechanisms are coupled, for movement together, by a rod 90 welded to one cam on the left-hand side of FIG. 2, and with a lost-motion connection on the right-hand side of FIG. 2: the lug 82 has a slot which receives the handle shank and the rod, side by side, and the two are welded together. There is sufficient clearance in the slot for the two mechanisms to reengage separately of one another, which is an advantage in increasing tolerances in manufacture.

The invention may be applied in a fixed seat, that is, one which is not arranged to throw forward, and also in a seat using a mechanism at one side only and a plain hinge at the other side. Whilst the foregoing description illustrates a mechanism for attachment to subframes, the mechanism may alternatively be built into the frames using for example teeth 47 formed on the lower end of the backrest instead of on plates attached thereto.

A spring is provided (not shown) for urging the backrest towards an upright position as illustrated in FIG. 1.

I claim:

1. A mechanism for adjusting the angle between the base and the back of a motor vehicle seat, which comprises:
    1. a first member connectable to said seat back and having a circular aperture therein;
    2. a second member connectable to said seat base and having an elongated aperture therein;
    3. pivot means having a pivot axis and passing through said circular aperture and said elongated aperture for permitting relative movement between said first and second members transversely of said pivot axis;
    4. a first, toothed segmental gear mounted on said first member;
    5. a second, toothed segmental gear mounted on said second member, said second gear being engaged with, and disengaged from, said first gear by said relative movement;
    6. a first abutment on said second member;
    7. a cam pivotal about said pivot means, said cam having an outwardly extending portion such that, when said cam is rotated about said pivot means, said portion engages said first abutment to produce said relative movement;
    8. a second abutment on said second member;
    9. spring means connected between said cam and a fixed position on said second member, for biasing said cam such that the teeth of said first gear engage the teeth of said second gear, said cam engaging, and reacting with, said second abutment when so biased; and
    10. a carrier for restraining motion of said cam, said carrier being pivotally mounted on said second member on the side of the major axis of said elongated aperture opposite to said second abutment.

2. The mechanism according to claim 1, further comprising a bush slidably positioned in said elongated aperture, for providing the pivotal connection between said first and second members, said bush also being journaled in said carrier.

3. The mechanism according to claim 1, wherein said second toothed gear is mounted on one face of said second member and said cam and carrier are proximate the opposite face thereof.

4. The mechanism according to claim 1, wherein said second member comprises a plate connectable to said seat base, and said second segmental gear is arcuate about the pivotal axis, substantially symmetrical about the major axis of the elongated aperture, and located below said aperture.

5. A seat comprising a base and back and including at least one mechanism according to claim 1.

* * * * *